Patented Sept. 5, 1950

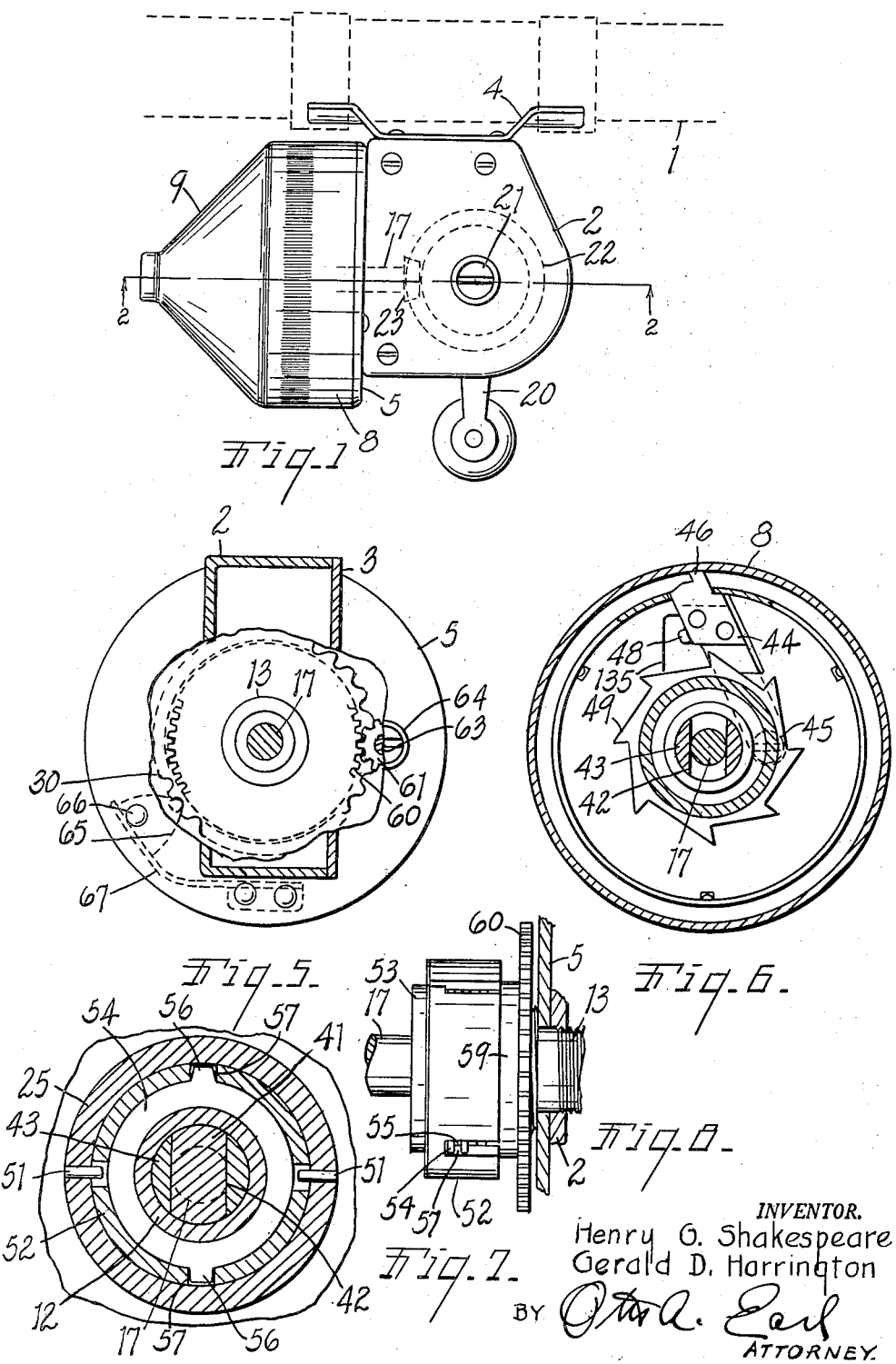
Sept. 5, 1950 H. G. SHAKESPEARE ET AL 2,521,543
FISHING REEL OF THE TYPE KNOWN AS SPINNING REEL
Filed Feb. 14, 1949 2 Sheets-Sheet 1
INVENTOR.
Henry G. Shakespeare
Gerald D. Harrington
BY
ATTORNEY.

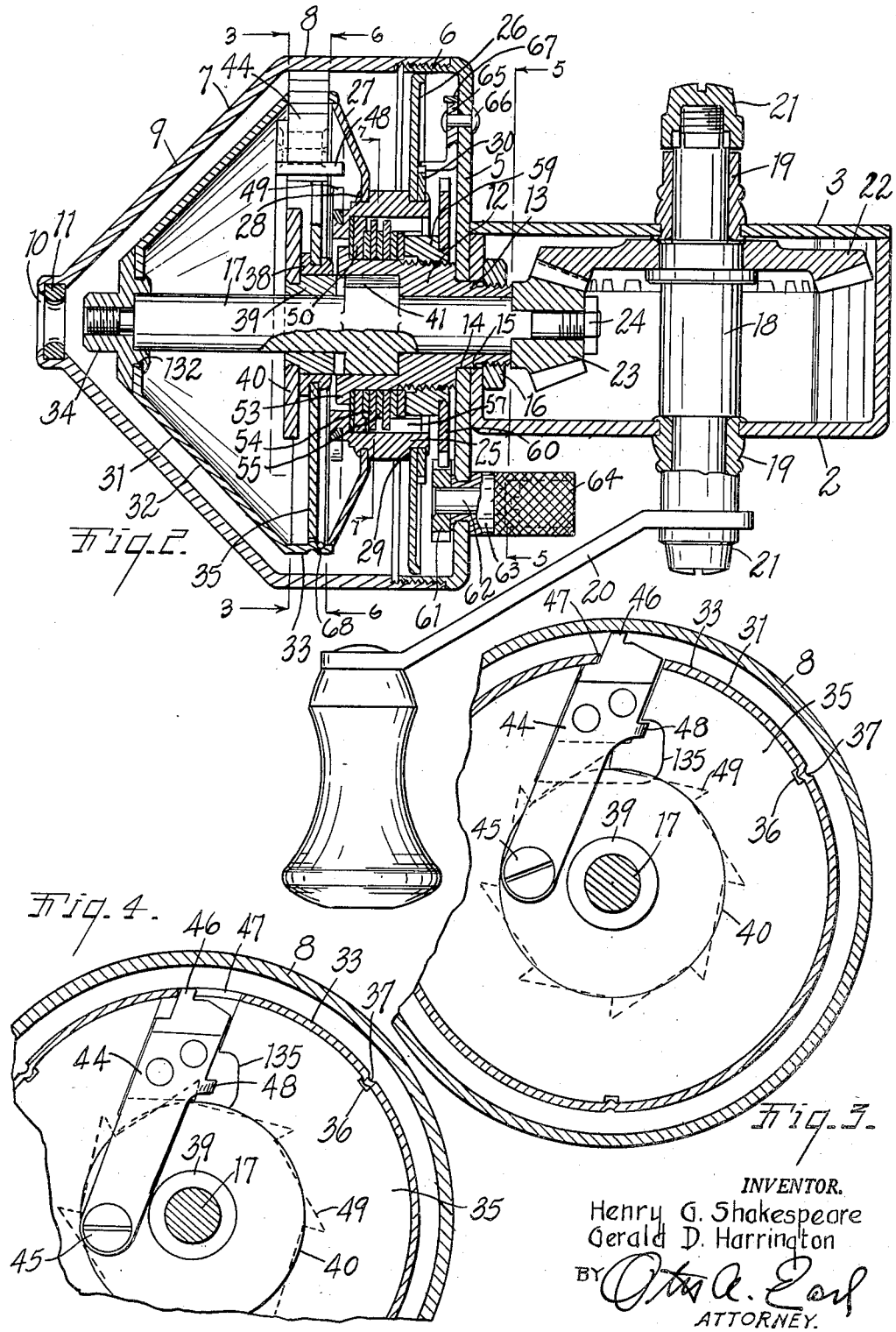

2,521,543

UNITED STATES PATENT OFFICE 2,521,543

FISHING REEL OF THE TYPE KNOWN AS "SPINNING REEL"

Henry G. Shakespeare and Gerald D. Harrington, Kalamazoo, Mich., assignors to Shakespeare Company, Kalamazoo, Mich., a corporation of Michigan Application February 14, 1949, Serial No. 76,374

17 Claims. (Cl. 242—84.1)

This invention relates to improvements in fishing reels of the type known as "spinning reels."

The main objects of this invention are:

First, to provide a fishing reel of the spinning type which is compact and at the same time of relatively large capacity and is adapted for mounting on a rod in a fixed relation thereto as distinguished from a swivel mounting.

Second, to provide a fishing reel of this type in which the line is automatically picked up and distributed to the spool by line winding rotation of the crank and is released by a slight reverse movement of the crank.

Third, to provide a friction brake operatively associated with the spool which may be easily adjusted to desired friction, the adjusting means being conveniently positioned for manipulation.

Fourth, to provide a structure having these advantages in which the parts are simple and economical to produce and may be readily assembled.

Objects relating to details and economies of the invention will appear from the description to follow. The invention is pointed out in the claims.

A preferred embodiment of the invention is illustrated in the accompanying drawing in which:

Fig. 1 is a side elevational view of the reel of our invention illustrated in operative relation to a fishing rod indicated by dotted lines.

Fig. 2 is an enlarged fragmentary view mainly in longitudinal section on a line 2—2 of Fig. 1.

Fig. 3 is a fragmentary view in transverse section on a line corresponding to line 3—3 of Fig. 2, the line pickup being in its actuated position.

Fig. 4 is a fragmentary sectional view corresponding to that of Fig. 3 with the line pickup in retracted position.

Fig. 5 is a fragmentary view on a line corresponding to line 5—5 of Fig. 2 with parts partially shown by dotted lines.

Fig. 6 is a transverse sectional view on a line corresponding to line 6—6 of Fig. 2.

Fig. 7 is an enlarged fragmentary view on a line corresponding to line 7—7 of Fig. 2.

Fig. 8 is a fragmentary view partially in section illustrating further details.

In the accompanying drawing a fishing rod is indicated by dotted lines 1 to show the relation of the reel of our invention thereto. Our fishing reel comprises a gear box 2 having a removable side plate 3, this gear box being of flat section. The gear box is provided with a reel seat clip 4.

The housing for the spool is, in the embodiment illustrated, formed separately from the gear box and comprises the backplate 5 having a forwardly projecting externally threaded peripheral flange 6. The housing shell designated generally by the numeral 7 comprises a cylindrical part 8 threaded upon the flange 6 and a front forwardly tapered conical portion 9 having a line eye or opening 10 at its apex provided with a wear resisting insert 11.

The bearing member 12 has a reduced portion 13 disposed through aligned openings 14 and 15 in the backplate and the front wall of the gear box. The nut 16 threaded upon the reduced portion clamps the bearing 12 to the gear box. The gear box and back plate are riveted or otherwise secured together, the means not being shown. The driven shaft 17 is supported by this bearing longitudinally of the reel. The crank shaft 18 is disposed transversely of the gear box and of the driven shaft and is supported in bearings 19 carried by the side walls of the gear box. The crank 20 may be engaged on either end of the crank shaft, it being retained thereon by means of the threaded caps 21. This enables the reel being readily changed from a right to a left hand reel or for mounting it in a depending position on the rod as shown in Fig. 1 or in an upright position thereon as desired.

The beveled driving gear 22 is mounted on the crank shaft to coact with the beveled driven gear 23 of the driven shaft which is secured thereon by means of the nut 24 threaded on the rear end of the driven shaft. The removable gear box side 3 facilitates assembling and permits lubrication of the gears.

The spool comprises the annular barrel 25 disposed concentrically of the shaft 17, the rear flange 26 and the conical front flange 27. The periphery of the rear flange is closely adjacent to the housing while the periphery of the front flange is spaced therefrom. The flanges are sleeved upon reduced portions of the barrel and secured thereto by upsetting as at 28 and 29, the upsetting 29 also securing the click pinion 30.

The line guide member 31 comprises a conical front portion 32 and a cylindrical rear portion 33, the rear end of which overlaps the front spool flange so that the line is effectively guided to and from the spool. This line guide is disposed concentrically of the housing in spaced relation thereto permitting the line to pass between the housing and the guide member around the guide member. The guide member is further supported by the plate 35 disposed within the cylindrical portion 33 thereof and in supporting relation thereto, the plate having angularly spaced peripheral notches 36 which are engaged by the inset portions 37 as shown in Figs. 3 and 4. This plate is provided with a hub 38 rotatable on the hub 39 of the disc 40.

For convenience in assembling, the shaft 17 is provided with an enlargement 41 having flattened portions 42 engaged by the fork-like extensions 43 of the hub 39 so that the member 40 is rotatably connected to the shaft. The pickup member 44 is pivotally connected to the disc 40 at 45. This provides an eccentric connection for the pickup to the shaft. The disc 40 is employed instead of an arm as it provides better balancing of the parts. The pickup member 44 is provided with a line engaging finger 46 desirably of hardened or wear resisting material. This pickup finger is adapted to be projected through the opening 47 in the cylindrical part 33 of the line guide member.

The rear guide member is supported at its front end on the hub 34 at the front end of the driven shaft and has a somewhat loose engagement with the hub permitting rotative movement of the guide member relative to the shaft, the purpose of which will be further pointed out in its relation to other parts.

The opening 135 in the plate 35 receives the spool engaging dog or detent 48 which coacts with the ratchet wheel 49 on the spool barrel. With this arrangement the pickup member is projected or actuated to pickup position by rotation of the crank in line winding direction. When the pickup member is retracted by a reverse movement of the crank, the dog or pawl 48 engages one of the teeth of the ratchet member and indicates to the operator when the pickup member is retracted and the reel ready for casting.

As we have stated, the guide member 31 is mounted on the hub for limited movement, this movement being of importance as the guide member acts as a housing for the pickup member 44 which operates through the slot in the portion 33 of the guide member and therefore independent movement of the shaft, shown at 132, for a relatively small rotating movement as the shaft is driven through the crank to operate the pickup in either direction is desirable. The portion 33 of the guide member serves the important function of keeping the line out of the space between the pickup mechanism and the edge of the spool and this lost motion connection or relation of the parts permits their free operation.

In the embodiment illustrated, the spool barrel is of such internal diameter as to receive the spool supporting means and the friction brake assembly. In this embodiment the spool barrel is directly supported by the member 52, being connected thereto by the pins 51 engaging slots in the member 52 as shown in Fig. 7. The member 52 has a radial portion 50 engaging the bearing member 12 which is flanged at 53. Friction disc elements 54 and 55 are provided, the elements 54 having lugs 56 engaging slots 57 in the member 50, see Figs. 2 and 7.

The brake is controlled by means of the control or adjusting member 59 threaded upon the bearing member 12 and provided with a toothed gear 60. The driving pinion 61 is provided with a stem 62 arranged through the bar 63 on the backplate of the housing and provided with a finger piece 64. This provides very sensitive adjustment for the spool brake which is set to the desired degree in playing a fish. The finger piece is in convenient position for manipulation. The click detent 65 is mounted on the pivot 66 to coact with the click pinion 30. The click detent is yieldably held in engagement with the click pinion by means of the plate spring 67. The supporting plate 35 is, in the embodiment illustrated, retained by means of the snap ring 68 engaging a groove provided therefor in the inner side of the guide member.

With the parts thus formed and arranged, they can be easily assembled and disassembled should occasion require. Further, they are so arranged that they are not subjected to undue stress or strain, that is, they are in effective supporting relation to each other thus enabling the use of relatively light parts.

The commercial reels of this so-called spinning type with which the applicants are familiar are commonly mounted for swiveling adjustment so that they are adjusted in one position for casting or when the line is being payed out and into another position for convenient winding or retracting of the line. In the applicants' structure the reel is positioned for convenient manipulation both in casting and winding. While the line is freely payed out when the line pickup is retracted, the line pickup may be quickly projected and the reel operated to wind up the line merely by a forward or line wind rotation of the crank and it is instantly released by a slight reverse rotation of the crank. The braking friction may be as conveniently adjusted as desired.

We have illustrated and described our invention in a highly practical embodiment thereof. We have not attempted to illustrate or describe other embodiments or adaptations as we believe this disclosure will enable those skilled in the art to embody or adapt our invention as may be desired.

Having thus described our invention, what we claim as new and desire to secure by Letters Patent is:

1. In a fishing reel, the combination of a gear box provided with a rod clip, a housing backplate, a housing shell comprising a cylindrical rear portion mounted upon said backplate and a conical front portion provided with a line eye at the apex thereof, said housing backplate being disposed against the front wall of the gear box, the backplate and said wall having aligned openings therein, a main bearing member disposed through said openings and secured to said gear box, a driven shaft disposed in said bearing and having a noncircular enlargement positioned within said main bearing member, a crank shaft disposed transversely of said gear box and having a driving connection to said driven shaft and provided with a crank, a spool comprising a barrel disposed in spaced concentric relation to said main bearing member, a substantially flat rear flange, the periphery of which is closely adjacent the housing, and a conical forwardly inclined front flange, the periphery of which is substantially spaced from the housing shell, a conical line guide member disposed in spaced concentric relation to said housing shell, said driven shaft having a hub at its front end on which the front end guide member is supported, said line guide member having a cylindrical flange at its rear end embracing the periphery of said front spool flange, a pickup member provided with a pickup finger, said guide member flange being provided with an opening through which the pickup member may be projected into the space between the housing shell and the line guide member and into close noncontacting proximity to th shell, a connecting member for said pickup member to said driven shaft having a hub engaging the noncircular portion of said shaft, said pickup member being eccentrically connected to said connecting member, a supporting plate disposed within the flange of said line guide member and supported on said hub of said connecting member, a ratchet wheel mounted on said spool at the front side of the front flange thereof, and a pawl on said pickup member engaging said ratchet wheel when the pickup member is in retracted position, said supporting plate having an opening therein through which said pawl projects, said pickup member being actuated to pickup position by the winding rotation of the crank and retracted by reverse rotation thereof.

2. In a fishing reel, the combination of a housing having a conical front portion provided with a line eye at the apex thereof, a main bearing member, a driven shaft disposed in said bearing and having a noncircular enlargement positioned within said main bearing member, a crank shaft disposed transversely of said gear box and having a driving connection to said driven shaft and provided with a crank, a spool comprising a barrel disposed in spaced concentric relation to said main bearing member, a substantially flat rear flange, the periphery of which is closely adjacent the housing, and a conical forwardly inclined front flange, the periphery of which is substantially spaced from the housing shell, a conical line guide member disposed in spaced concentric relation to said housing shell and mounted on said driven shaft for limited movement relative thereto, said line guide member having a cylindrical flange at its rear end embracing the periphery of said front spool flange, a pickup member provided with a pickup finger, said guide member flange being provided with an opening through which the pickup member may be projected into the space between the housing and the line guide member and into close noncontacting proximity to the housing, a connecting member for said pickup member to said driven shaft having a hub engaging the noncircular portion of said shaft, said pickup member being eccentrically connected to said connecting member, a supporting plate disposed within the flange of said line guide member and supported on said hub of said connecting member, a ratchet wheel mounted on said spool at the front side of the front flange thereof, and a pawl on said pickup member engaging said ratchet wheel when the pickup member is in retracted position, said supporting plate having an opening therein through which said pawl projects, said pickup member being actuated to pickup position by the winding rotation of the crank and retracted by reverse rotation thereof.

3. In a fishing reel, the combination of a gear box provided with a rod clip, a housing comprising a backplate, a cylindrical rear portion mounted upon said backplate and a conical front portion provided with a line eye at the apex thereof, said housing backplate being disposed against the front wall of the gear box, the backplate and said wall having aligned openings therein, a main bearing member disposed through said openings and secured to said bear box, a driven shaft disposed in said bearing, a crank shaft disposed transversely of said gear box and having a driving connection to said driven shaft and provided with a crank, a spool comprising a barrel disposed in spaced concentric relation to said main bearing member, a rear flange, and a front flange the periphery of which is substantially spaced from the housing, a conical line guide member disposed in spaced concentric relation to said conical front portion of said housing and mounted at its front end on the front end of said driven shaft with the rear end of said line guide member embracing the periphery of said front spool flange, a pickup member, said guide member having an opening through which the pickup member may be projected into the space between the housing and the line guide member, said pickup member being eccentrically connected to said driven shaft, a ratchet wheel on said spool, a pawl on said pickup member engaging said ratchet wheel when the pickup member is in retracted position, said pickup member being actuated to pickup position by the winding rotation of the crank and retracted by reverse rotation thereof.

4. In a fishing reel, the combination of a housing having a conical front portion provided with a line eye at the apex thereof, said housing backplate being disposed against the front wall of the gear box, the backplate and said wall having aligned openings therein, a main bearing member disposed through said openings and secured to said gear box, a driven shaft, a spool comprising a front flange the periphery of which is substantially spaced from the housing, a conical line guide member disposed in spaced concentric relation to said conical front portion of said housing and rotatably mounted at its front end on the front end of said driven shaft with the rear end of said line guide member embracing the periphery of said front spool flange, a pickup member, said guide member having an opening through which the pickup member may be projected into the space between the housing and the line guide member, said pickup member being eccentrically connected to said driven shaft, a ratchet wheel on said spool, a pawl on said pickup member engaging said ratchet wheel when the pickup member is in retracted position, said pickup member being actuated to pickup position by the winding rotation of the crank and retracted by reverse rotation thereof.

5. In a fishing reel, the combination of a housing having a conical front portion provided with a line eye at the apex thereof, a driven shaft, a spool comprising a front flange the periphery of which is substantially spaced from the housing, a conical line guide member disposed in spaced concentric relation to said conical front portion of said housing and mounted at its front end on the front end of said driven shaft with the rear end of said line guide member closely adjacent to the periphery of said front spool flange, a pickup member, said guide member having an opening through which the pickup member may be projected into the space between the housing and the line guide member, said pickup member being eccentrically connected to said driven shaft, a ratchet wheel on said spool, a pawl on said pickup member engaging said ratchet wheel when the pickup member is in retracted position, said pickup member being actuated to pickup position by the winding rotation of the crank and retracted by reverse rotation thereof, a friction brake unit mounted between said bearing member and spool barrel and including an element supported by said bearing and constituting a support for said spool barrel and connected thereto, a brake control member threaded upon said main bearing and provided with a toothed adjusting member, and a pinion coacting therewith and provided with a spindle disposed through said housing backplate and having a finger piece disposed at the side of the gear box.

6. In a fishing reel, the combination of a gear box provided with a rod clip, a housing backplate, a housing shell comprising a cylindrical rear portion mounted upon said backplate and a conical front portion provided with a line eye at the apex thereof, said housing backplate being disposed against the front wall of the gear box, the backplate and said wall having aligned openings therein, a main bearing member disposed through said openings and secured to said gear box, a driven shaft disposed in said bearing and having a non-circular enlargement positioned within said main bearing member, a crank shaft disposed transversely of said gear box and having a driving connection to said driven shaft and provided with a crank, a spool disposed in spaced concentric relation to said main bearing member, and having a front flange peripherally spaced from said shell, a conical line guide member disposed in spaced concentric relation to said housing shell and mounted at its front end on the front end of said driven shaft, a pickup member, said guide member being provided with an opening through which the pickup member may be projected into the space between the housing shell and the line guide member, an eccentric connection for said pickup member to said driven shaft, a supporting plate for the rear end of said line guide member carried by said shaft, a ratchet wheel on said spool, a pawl on said pickup member engaging said ratchet wheel when the pickup member is in retracted position, said supporting plate having an opening therein through which said pawl projects, said pickup member being actuated to pickup position by the winding rotation of the crank and retracted by reverse rotation thereof.

7. In a fishing reel, the combination of a gear box provided with a rod clip, a housing backplate, a housing shell comprising a cylindrical rear portion mounted upon said backplate and a conical front portion provided with a line eye at the apex thereof, said housing backplate being disposed against the front wall of the gear box, the backplate and said wall having aligned openings therein, a main bearing member disposed through said openings and secured to said gear box, a driven shaft disposed in said bearing and having a noncircular enlargement positioned within said main bearing member, a crank shaft disposed transversely of said gear box and having a driving connection to said driven shaft and provided with a crank, a spool disposed in spaced concentric relation to said main bearing member, a conical line guide member disposed in spaced concentric relation to said housing shell and mounted on said driven shaft, a pickup member, said guide member being provided with an opening through which the pickup member may be projected into the space between the housing shell and the line guide member, an eccentric connection for said pickup member to said driven shaft, a ratchet wheel on said spool, a pawl on said pickup member engaging said ratchet wheel when the pickup member is in retracted position, said pickup member being actuated to pickup position by the winding rotation of the crank and retracted by reverse rotation thereof.

8. In a fishing reel, the combination with a housing provided with a conical front portion having a line eye at the apex thereof, a driven shaft disposed centrally of the housing and longitudinally relative thereto, a bearing for said shaft carried by said housing, a spool comprising a barrel, a substantially flat rear flange and a conical forwardly inclined front flange, said barrel being disposed in concentric spaced relation to said shaft bearing, a conical line guide mounted on said shaft in concentric spaced relation to said housing and having a cylindrical flange at its rear end embracing the periphery of the front spool flange, said flange having an opening therein, a line pickup member slidably supported to be projected through said opening, an actuating member rotatable with said shaft, said pickup member being eccentrically connected to said actuating member, a ratchet member on said spool, a pawl coacting therewith carried by said pickup member and adapted to engage the same when the pickup member is retracted, and a crank operatively connected to said shaft, said pickup member being actuated by movement of said crank in winding direction and being retracted by reverse movement thereof.

9. In a fishing reel, the combination of a housing provided with a conical front portion terminating in a line eye, a longitudinally disposed driven shaft, a crank shaft disposed transversely of and at the rear of said driven shaft and having driving connection with said driven shaft, a crank, said crank shaft being adapted to receive the crank at either end thereof, a spool disposed concentrically of said shaft and rotatably supported relative thereto, a conical line guide member mounted on said shaft for rotation therewith and disposed in concentric spaced relation to said conical portion of said housing, and a line pickup member mounted on said guide member to be projected peripherally therefrom, said pickup member being connected to said driven shaft to be controlled from said crank, said pickup member being provided with spool engaging means when it is in its retracted position.

10. In a fishing reel, the combination of a housing provided with a front line guide portion having a line eye, a longitudinally disposed driven shaft, a crank shaft provided with a crank and having driving connection with said driven shaft, a spool disposed concentrically of said shaft and rotatably supported relative thereto, a line guide member mounted on said shaft for rotation therewith and disposed in concentric spaced relation to said line guide portion of said housing, a pickup member mounted on said guide member to be projected peripherally therefrom, said pickup member being operatively connected to said driven shaft to be controlled from said crank, said pickup member being provided with spool engaging means when it is in its restricted position, a friction brake unit interposed between said spool and said bearing member, and means for manually adjusting said brake means including a toothed member, a pinion coacting therewith, and provided with a spindle having a fingerpiece.

11. In a fishing reel, the combination of a housing provided with a front line guide portion terminating a line eye, a longitudinally disposed driven shaft, a crank shaft provided with a crank and having driving connection with said driven shaft, a spool disposed concentrically of said shaft and rotatably supported relative thereto, a line guide member mounted on said shaft for rotation therewith and disposed in concentric spaced relation to said line guide portion of said housing, a pickup member mounted on said guide member to be projected peripherally therefrom, said pickup member being operatively connected to said driven shaft to be controlled from said crank, said pickup member being provided with spool engaging means when it is in its retracted position.

12. In a fishing reel, the combination of a housing provided with a front line guide portion having a line guide, a driven shaft disposed longitudinally of said housing, a spool supported for rotation independently of said shaft, a line guide mounted on said shaft in concentric relation to the line guide portion of said housing and in operative relation to said spool to guide a line to and from the spool, a line pickup member mounted for rotation with the line guide member and supported to be projected through said line guide member to line pickup position or to be retracted within the line guide member, operating connections for said pickup member to said shaft whereby the pickup member is actuated when the shaft is rotated in one direction and retracted when it is rotated in the reverse direction, a crank operatively connected to said shaft, and a manually actuated variable friction control brake for said spool.

13. In a fishing reel, the combination of a housing provided with a front outer line guide portion having a line guide eye, a driven shaft disposed longitudinally of said housing, a spool supported for rotation independently of said shaft, an inner line guide mounted on said shaft in concentric relation to the said outer line guide portion of said housing and in operative relation to said spool to guide a line to and from the spool, a line pickup member mounted for rotation with the inner line guide member and supported to be projected through said inner line guide member to line pickup position or to be retracted within the inner line guide member, operating connections for said pickup member to said shaft whereby the pickup member is actuated when the shaft is rotated in one direction and retracted when it is rotated in the reverse direction, and a crank operatively connected to said shaft.

14. In a fishing reel, the combination of a housing provided with a conical front portion having a line guide at the apex thereof, a driven shaft disposed longitudinally of said housing, a spool supported for rotation independently of said shaft, a conical line guide mounted on said shaft in concentric relation to the conical portion of said housing and in operative relation to said spool to guide a line to and from the spool, a line pickup member mounted for rotation with the line guide member and supported to be projected through said line guide member to line pickup position or to be retracted to inoperative position, operating connections for said pickup member to said shaft whereby the pickup member is actuated when the shaft is rotated in one direction and retracted when it is rotated in the reverse direction, and a crank operatively connected to said shaft.

15. In a fishing reel, the combination with a housing provided with a conical front portion having a line guide eye at the apex thereof, a shaft mounted within the housing, a spool rotatably supported for rotation independently of said shaft, a conical line guide disposed in spaced relation to the conical portion of said housing to guide a line to and from said spool through said eye, a line pickup member mounted to be projected into the space between the line guide and the housing or retracted therefrom, operating connections for said pickup member to said shaft whereby the pickup member is actuated to pickup position by the rotation of the shaft in line winding direction and retracted by rotation of the shaft in reverse direction, and a manually actuated control brake for said spool operable independently of the operation of the shaft.

16. In a fishing reel, the combination with a housing provided with a conical front portion having a line guide eye at the apex thereof, a shaft mounted within the housing, a spool rotatably supported for rotation independently of said shaft, a conical line guide disposed in front of said spool and in spaced relation to the conical portion of said housing to guide a line to and from said spool through said eye, a line pickup member mounted to be projected into the space between the line guide and the housing or retracted therefrom, and operating connections for said pickup member to said shaft whereby the pickup member is actuated to pickup position by the rotation of the shaft in line winding direction and retracted by rotation of the shaft in reverse direction.

17. In a fishing reel, the combination with a housing provided with a front outer line guide portion having a line guide eye at the apex thereof, a driven shaft disposed longitudinally of the housing, means for mounting the housing on a rod with the shaft extending longitudinally of the rod, an inner line guide mounted on said driven shaft for limited rotative movement relative thereto and in concentric spaced relation to the outer line guide portion of the housing, a spool disposed at the rear end of said inner line guide and supported for rotation independently of the shaft, a line pickup member supported to be projected into the space between the line guide and the housing and operatively connected to the driven shaft, a crank shaft disposed transversely of said driven shaft and having driving connections therewith, and a crank for said crank shaft, the connections for said pickup member to said driven shaft being such that the pickup member is actuated by movement of the crank in winding direction and retracted by reverse movement thereof.

HENRY G. SHAKESPEARE.
GERALD D. HARRINGTON.

No references cited.